(12) United States Patent
Hiraoka et al.

(10) Patent No.: US 11,313,296 B2
(45) Date of Patent: Apr. 26, 2022

(54) CONTROL DEVICE FOR INTERNAL COMBUSTION ENGINE

(71) Applicant: DENSO CORPORATION, Kariya (JP)

(72) Inventors: Shinichi Hiraoka, Kariya (JP); Yukitoshi Shida, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/315,848

(22) Filed: May 10, 2021

(65) Prior Publication Data

US 2021/0262406 A1 Aug. 26, 2021

Related U.S. Application Data

(63) Continuation of application No. PCT/JP2019/042679, filed on Oct. 30, 2019.

(30) Foreign Application Priority Data

Nov. 13, 2018 (JP) .............................. JP2018-213189

(51) Int. Cl.
*F02D 41/00* (2006.01)
*F02D 41/40* (2006.01)
*F02D 41/38* (2006.01)

(52) U.S. Cl.
CPC ..... *F02D 41/0087* (2013.01); *F02D 41/0002* (2013.01); *F02D 41/401* (2013.01); *F02D 2041/001* (2013.01); *F02D 2041/389* (2013.01)

(58) Field of Classification Search
CPC ......... F02D 2041/001; F02D 2041/389; F02D 41/0002; F02D 41/0087; F02D 41/401; F02D 2041/047
See application file for complete search history.

(56) References Cited

U.S. PATENT DOCUMENTS

| 5,584,277 | A | * | 12/1996 | Chen | ..................... | F02D 41/107 |
| | | | | | | 123/480 |
| 5,935,188 | A | * | 8/1999 | Jaye | ...................... | F02D 41/047 |
| | | | | | | 701/104 |
| 2005/0022776 | A1 | * | 2/2005 | Montgomery | ...... | F02D 41/3029 |
| | | | | | | 123/295 |
| 2005/0205049 | A1 | * | 9/2005 | Lewis | ................. | F01L 13/0005 |
| | | | | | | 123/198 DB |

(Continued)

FOREIGN PATENT DOCUMENTS

| JP | 2002-327651 | 11/2002 |
| JP | 2005-146917 | 6/2005 |
| JP | 3771101 | 4/2006 |

*Primary Examiner* — Carl C Staubach
(74) *Attorney, Agent, or Firm* — Nixon & Vanderhye P.C.

(57) ABSTRACT

When an engine is started, an ECU determines whether an inside of a cylinder is in a wet concerned state in which there is a concern about fuel wet, or the inside of the cylinder is in a liquid particle float state in which a large volume of floating liquid particle of fuel arise. On determination that it is in the wet concerned state, the ECU performs a first control for reducing an intake air amount as a control of an opening timing and a closing timing by using the variable valve device. On determination that it is in the floating liquid particle state, the ECU performs a second control for increasing an in-cylinder temperature as a control of the opening timing and the closing timing by using the variable valve device.

13 Claims, 11 Drawing Sheets

(56) References Cited

U.S. PATENT DOCUMENTS

| | | | |
|---|---|---|---|
| 2008/0092835 A1* | 4/2008 | Abe | F02D 13/0238 123/90.15 |
| 2015/0285179 A1* | 10/2015 | Cohn | F02P 5/145 701/104 |
| 2015/0369162 A1* | 12/2015 | Cohn | F02D 41/064 123/406.27 |
| 2019/0145331 A1* | 5/2019 | Dudar | F02D 41/0007 123/519 |

* cited by examiner (a)

(b)

(a)

(b)

(c)

(a)

(b)

(c)

(a)

(b)

CONTROL DEVICE FOR INTERNAL COMBUSTION ENGINE

CROSS REFERENCE TO RELATED APPLICATION

The present application is a continuation application of International Patent Application No. PCT/JP2019/042679 filed on Oct. 30, 2019, which designated the U.S. and claims the benefit of priority from Japanese Patent Application No. 2018-213189 filed on Nov. 13, 2018. The entire disclosures of all of the above applications are incorporated herein by reference.

TECHNICAL FIELD

The present disclosure relates to a control device for an internal combustion engine.

BACKGROUND

Conventionally, a control device is provided to an internal combustion engine to control an opening timing and a closing timing of an intake valve or an exhaust valve.

SUMMARY

According to an aspect of the present disclosure, a control device is applicable to an internal combustion engine. The internal combustion engine includes: a fuel injection valve configured to inject fuel into a cylinder; and a variable valve device configured to change an opening timing and a closing timing of at least an intake valve among the intake valve and an exhaust valve. The control device is configured to control a fuel injection amount based on an intake air amount of the internal combustion engine and control the opening timing and the closing timing of the intake valve with the variable valve device based on an operating state of the internal combustion engine.

BRIEF DESCRIPTION OF THE DRAWINGS

The above and other objects, features and advantages of the present disclosure will become more apparent from the following detailed description made with reference to the accompanying drawings. In the drawings.

DESCRIPTION OF EMBODIMENTS

Figure 1:
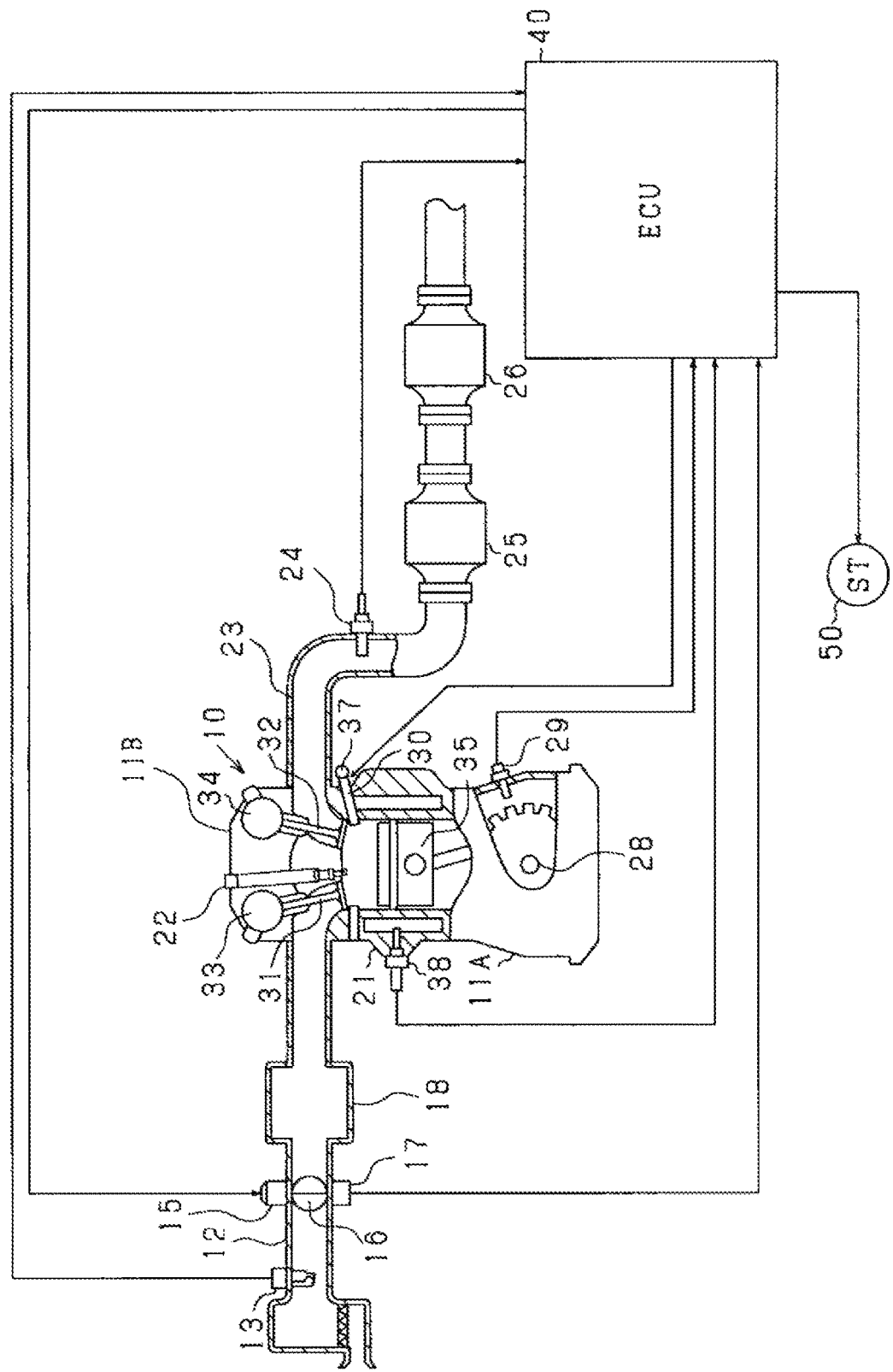
FIG. 1 is a diagram of an engine system.

Hereinafter, examples of the present will be described.

According to an example of the present disclosure, a control device is configured to control an opening timing and a closing timing of an intake valve or an exhaust valve for the purpose of reducing an emission amount of HC (hydrocarbon) in exhaust gas when an internal combustion engine is started. The control device controls the opening timing and the closing timing of the intake valve and the exhaust valve when the start of the internal combustion engine is detected based on a rotation speed of the internal combustion engine.

When the internal combustion engine is started, as an amount of unvaporized fuel in the cylinder may increase, and an amount of HC and PN (Particulate Number) in exhaust gas increases.

In an assumable configuration, the opening timing and the closing timing of the internal combustion engine may be controlled without considering the state of fuel in the cylinder. In this configuration, a concern arises that the discharged HC and PN cannot be sufficiently reduced depending on the condition of fuel.

According to an example of the present disclosure, a control device is applicable to an internal combustion engine. The internal combustion engine includes: a fuel injection valve configured to inject fuel into a cylinder; and a variable valve device configured to change an opening timing and a closing timing of at least an intake valve among the intake valve and an exhaust valve. The control device for the internal combustion engine is configured to control a fuel injection amount based on an intake air amount of the internal combustion engine and control the opening timing and the closing timing of the intake valve with the variable valve device based on an operating state of the internal combustion engine. The control device includes a determination unit configured to determine whether an inside of a cylinder is in a wet concerned state in which fuel wet is concerned or the inside of the cylinder is in a liquid particle float state in which a large volume of floating liquid particle of fuel arise, when the internal combustion engine is started; a first control unit configured to perform, as a control of the opening timing and the closing timing with the variable valve device, the first control to reduce the intake air amount when the determination unit determines that the inside of the cylinder is in the wet concerned state; and a second control unit configured to perform, as the control of the opening timing and the closing timing with the variable valve device, a second control to raise an in-cylinder temperature when the determination unit determines that the inside of the cylinder is in the liquid particle float.

A state in which fuel is not sufficiently vaporized in the cylinder includes a wet concerned state in which fuel wet is significantly concerned and a liquid particle float state in which a large volume of floating liquid particle of fuel arises. Both state are factors that increase the amount of HO and PN emissions. Herein, the fuel wet concerned state is caused by the fuel injection amount that is larger than an appropriate value, and the liquid particle float state is caused by the cylinder at a low temperature. The above configuration is configured to determine whether the inside of the cylinder is in the wet concerned state in which fuel wet is concerned or the inside of the cylinder is in the liquid particle float state in which a large volume of floating liquid particle of fuel arise, when the internal combustion engine is started. Then, when it is determined that the inside of the cylinder is in the wet concerned state, the first control for reducing the intake air amount is performed as the control of the opening timing and the closing timing by using the variable valve device. In this way, the fuel injection amount is reduced, and therefore, wet fuel in the cylinder is improved. Thus, HO and PN in exhaust gas can be reduced. To the contrary, when it is determined that the inside of the cylinder is in the floating liquid particle, the second control for increasing the in-cylinder temperature is performed as the control of the opening timing and the closing timing by using the variable valve device. In this way, fuel in the cylinder is easily vaporized, and therefore, fuel in the form of floating liquid particle is reduced, and HO and PN in exhaust gas can be reduced. As described above, the configuration enables to perform the appropriate control of the opening timing and the closing timing for reducing HO and PN according to the state of liquid in the cylinder. Therefore, the effect of reducing HO and PN in exhaust gas can be enhanced.

First Embodiment

Hereinafter, an engine control system as an embodiment embodying an internal combustion engine according to the present disclosure will be described with reference to the drawings. The engine control system includes an engine as an internal combustion engine mounted on a vehicle, and controls an operation of this engine.

An engine 10 shown in FIG. 1 is 4-cycle gasoline engine of an in-cylinder injection type. Specifically, the engine 10 is a 4-cylinder engine, and a cylinder block 11A is provided with four cylinders 21. In FIG. 1, only one cylinder 21 is shown, and the other cylinders are not shown. A piston 35 is arranged in the cylinder 21 so as to be configured to reciprocate. A reciprocating motion of the piston 35 causes a crankshaft 28 (output shaft) provided in the cylinder block 11A to rotate. In the present embodiment, a space formed by the inner wall of the cylinder 21 and an upper surface (top) of the piston 35 is referred to as an inside of the cylinder.

The engine 10 has an intake passage 12 that communicates with an intake port and allows intake air to be taken into the cylinder to flow therethrough, and an exhaust passage 23 that communicates with an exhaust port and allows exhaust gas exhausted from the cylinder 21 to flow therethrough.

The intake port and the exhaust port are provided with an intake valve 31 and an exhaust valve 32, respectively, that open and close according to the rotation of the camshaft (not shown). The intake valve 31 and the exhaust valve 32 are provided with a variable valve devices 33 and 34, respectively, that change the opening timing and the closing timings of the intake valve 31 and the exhaust valve 32, respectively. The variable valve devices 33 and 34 are configured to adjust a relative rotation phase between the crankshaft 28 and an intake camshaft and a relative rotation phase between the crankshaft 28 and an exhaust camshaft. The variable valve devices 33 and 34 are configured to perform phase adjustment to the advance angle side and the retard angle side with respect to a predetermined reference position. As the variable valve devices 33 and 34, a hydraulically driven valve gear or electrically driven variable valve device may be used.

The engine 10 is provided with an injector 30 as a fuel injection valve for each cylinder 21, and fuel is directly injected into the cylinder from the injector 30. A fuel pressure sensor 37 that detects a pressure of fuel supplied to the injector 30 (hereinafter referred to as fuel pressure) is provided to a flow path through which fuel flows from a fuel accumulator (not shown) to the injector 30.

An ignition plug 22 is attached to a cylinder head of the engine 10. A high voltage is applied to the ignition plug 22 at a desired ignition timing through an ignition coil or the like (not shown). By applying this high voltage, a spark discharge is generated between opposed electrodes of the ignition plug 22, and the fuel in the cylinder is ignited.

The engine 10 is provided with a crank angle sensor 29 that outputs a crank angle signal for each predetermined crank angle when the engine 10 is in operation. A rotation speed of the crankshaft 28 can be detected as an engine rotation speed Ne with the crank angle signal from the crank angle sensor 29. The cylinder block 11A is provided with a water temperature sensor 38 that detects a temperature of cooling water.

The intake passage 12 is provided with an airflow meter 13 that detects an amount of air as an intake air amount Ga taken into the cylinder. A throttle valve 16, whose opening degree is adjusted by a throttle actuator 15 such as a DC motor, is provided on a downstream side of the airflow meter 13 in the intake passage 12. A surge tank 18 is provided on the downstream side of the throttle valve 16 in the intake passage 12.

The exhaust passage 23 is provided with catalytic converters 25 and 26. The catalytic converters 25 and 26 are composed of a three-way catalyst including an exhaust purification catalyst, a gasoline particulate filter for removing PN in the exhaust, a 4-way-GPF in which a catalyst is supported on the GPF, and the like.

In the exhaust passage 23, an A/F sensor 24 for detecting an air-fuel ratio of exhaust gas is provided on the upstream side of the catalytic converters 25 and 26.

The engine control system includes an ECU 40 as a control device. The ECU 40 is provided with a microcomputer including a CPU, a ROM, a RAM, and the like. The microcomputer executes various control programs stored in ROM thereby to perform a control of an fuel injection amount Q of the injector 30, a control of an opening timing and a closing timing of the intake valve 31 and the exhaust valve 32, and a control of an ignition timing of the ignition plug 22 according to the engine operating state.

The ECU 40 computes the fuel injection amount Q according to the intake air amount Ga detected by using the airflow meter 13 and the engine rotation speed Ne, and causes the injector 30 to perform fuel injection based on the fuel injection amount Q.

The ECU 40 implements an ISS restart control as a start control of the engine 10 when a restart condition is satisfied. The ISS restart control automatically stops the engine 10, when a predetermined automatic stop condition is satisfied. Under this automatic stop state, the ISS restart control restarts the engine 10 by using a starter 50 as a start device when a predetermined restart condition is satisfied. The ECU 40 corresponds to a restart control unit.

Herein, in a state where an amount of fuel in an unvaporized state is large in the cylinder of the engine 10, the amount of HC and PM in the exhaust tends to increase. In particular, when the engine 10 is started, the catalysts included in the catalytic converters 25 and 26 are not activated. Therefore, even when exhaust gas passes through the catalytic converters 25 and 26, there is a concern that HC and PM will not be sufficiently purified and will be released into the atmosphere.

Figure 2:
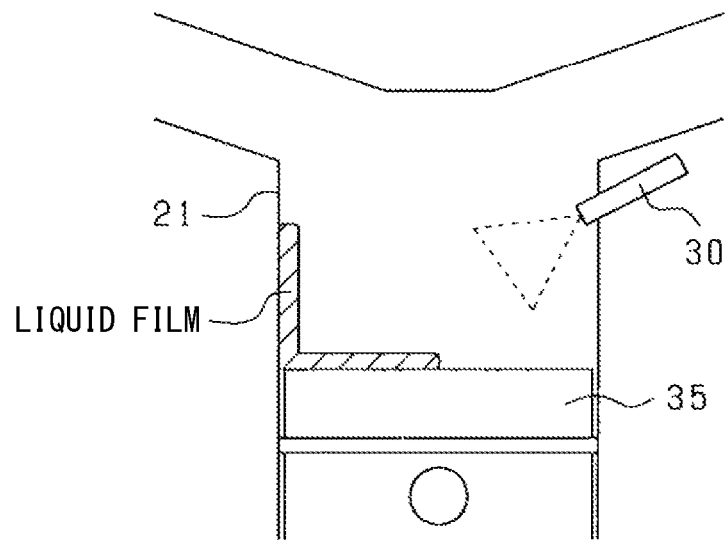
FIG. 2 is a diagram showing a state of unvaporized fuel in a cylinder.
Figure 2:
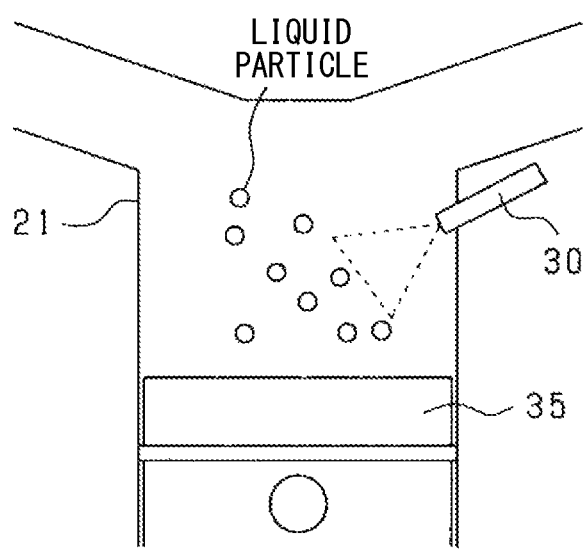

FIG. 2 is a diagram illustrating states of unvaporized fuel in the cylinder 21. (a) in FIG. 2 shows a state in which fuel wet is caused in the cylinder 21. The fuel wet is a state in which a large amount of fuel adheres to the inner wall surface or the upper part of the piston 35 in the form of a liquid film in the cylinder. Further, (b) in FIG. 2 shows a liquid particle float state in which an amount of fuel in the liquid particle float large is large in the cylinder. The fuel in the liquid particle float state is fuel that floats as droplets in air-fuel mixture in the cylinder. In either state, combustion of the air-fuel mixture in the cylinder deteriorates, which causes an increase in HC and PM in the exhaust gas.

The present embodiment, in the cylinder, a state, in which both the amount of fuel in the fuel wet and the amount of fuel in the liquid particle float state are small, is defined as a normal state that does not need to take into account of the wet concerned state and the liquid particle float state. A condition where the amount of fuel in the fuel wet is large and where the amount of fuel in the liquid particle float state is large is defined as a wet concerned state.

When the engine 10 is started, the ECU 40 determines whether the inside of the cylinder is in the wet concerned state or whether the inside of the cylinder is in the liquid particle float state. The ECU 40 computes the amount of unvaporized fuel WE, which is an index value indicating the amount of fuel generated in the unvaporized state in the cylinder. Based on this unvaporized fuel amount WE, the ECU 40 determines whether the inside of the cylinder is in the wet concerned state or in the liquid particle float state. Specifically, the unvaporized fuel amount WE is computed by using at least one of the cooling water temperature Tw indicating the temperature of the cooling water detected by the water temperature sensor 38, the fuel injection amount Q, and the fuel pressure Pf detected by the fuel pressure sensor 37. The ECU 40 corresponds to a wet amount computation unit.

Figure 3:
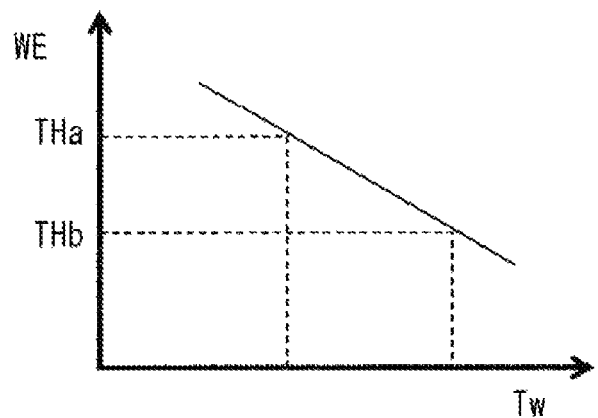
FIG. 3 is a view for explaining computation of an amount of fuel in an unvaporized state as generated.
Figure 3:
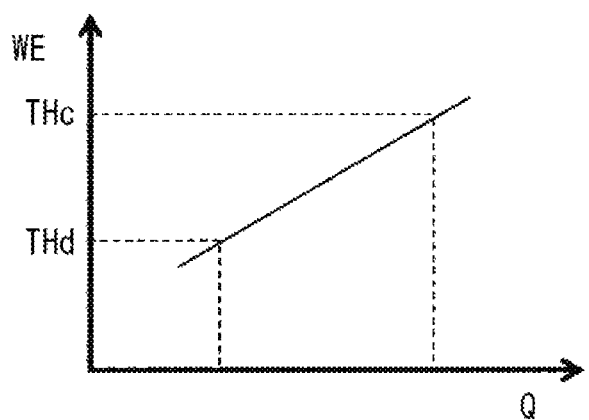
Figure 3:
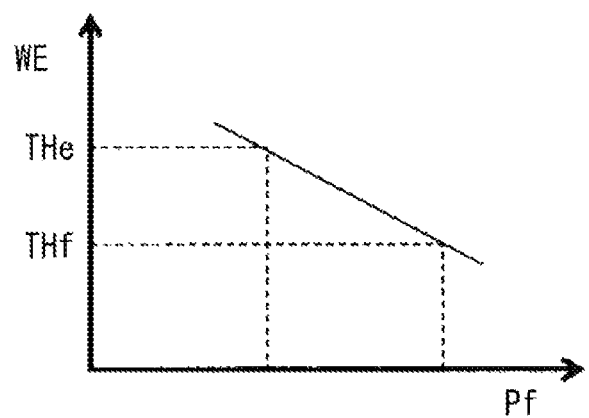

(a) in FIG. 3 is a view for explaining the computation of the unvaporized fuel amount WE using the cooling water temperature Tw, where the horizontal axis represents the cooling water temperature Tw and the vertical axis represents the unvaporized fuel amount WE. As the cooling water temperature Tw becomes lower, fuel is less likely vaporized in the cylinder. Therefore, as the cooling water temperature Tw becomes lower, the unvaporized fuel amount WE is set to be larger. In the present embodiment, when the unvaporized fuel amount WE is larger than a first temperature determination value THa, it is determined that the inside of the cylinder is in the wet concerned state. When the unvaporized fuel amount WE is equal to or less than the first temperature determination value THa and is larger than a second temperature determination value THb, it is determined that the inside of the cylinder is in the liquid particle float state. The second temperature determination value THb is smaller than the first temperature determination value THa. When the amount of unvaporized fuel WE is equal to or less than the second temperature determination value THb, it is determined that the inside of the cylinder is in a normal state.

(b) in FIG. 3 is a view for explaining computation of the unvaporized fuel amount WE by using the fuel injection amount Q, where the horizontal axis is the fuel injection amount Q and the vertical axis is the unvaporized fuel amount WE. As the fuel injection amount Q increases, the amount of wet fuel in the cylinder tends to increase. Therefore, as the fuel injection amount Q becomes larger, the unvaporized fuel amount WE is set to be larger. In the present embodiment, when the unvaporized fuel amount WE is larger than a first injection amount determination value THc, it is determined that the inside of the cylinder is in the wet concerned state. When the unvaporized fuel amount WE is equal to or less than the first injection amount determination value THc and is larger than a second injection amount determination value THd, it is determined that the inside of the cylinder is in the liquid particle float state. The second injection amount determination value THd is a value smaller than the first injection amount determination value THc. When the amount of unvaporized fuel WE is equal to or less than the second injection amount determination value THd, it is determined that the inside of the cylinder is in the normal state.

(c) in FIG. 3 is a view for explaining computation of the unvaporized fuel amount WE by using the fuel pressure Pf, where the horizontal axis is the fuel injection pressure Pf and the vertical axis is the unvaporized fuel amount WE. As the fuel pressure Pf becomes lower, fuel is less likely vaporized. Therefore, as the fuel pressure Pf becomes lower, the unvaporized fuel amount WE is set to be larger. In the present embodiment, when the unvaporized fuel amount WE is larger than a first fuel pressure determination value THe, it is determined that the inside of the cylinder is in the wet concerned state. When the unvaporized fuel amount WE is equal to or less than the first fuel pressure determination value THe and is larger than a second fuel pressure determination value THf, it is determined that the inside of the cylinder is in the liquid particle float state. The second fuel pressure determination value THf is a value smaller than the first fuel pressure determination value THe. When the amount of unvaporized fuel WE is equal to or less than the second fuel pressure determination value THf, it is determined that the inside of the cylinder is in a normal state. The ECU 40 corresponds to a determination unit.

Instead of the individually determining the state inside the cylinder by using the unvaporized fuel amount WE shown in (a) to (c) in FIG. 3, a summation of the unvaporized fuel amount WE may be used for determining the state inside of the cylinder. In this case, a weight may be given to each of the unvaporized fuel amount WE computed by using the cooling water temperature Tw, the unvaporized fuel amount WE computed by using the fuel injection amount Q, and the unvaporized fuel amount WE computed by using the fuel pressure Pf. Further, as a parameter for calculating the amount of unvaporized fuel WE, the injection timing of the injector 30 or the engine rotation speed Ne may be used. As the injection timing of the injector 30 becomes farther from the BDC, the distance from the injection port of the injector 30 to the piston 35 becomes smaller in the cylinder. Therefore, the amount of fuel adhering to the upper surface of the piston 35 increases, and the amount of unvaporized fuel WE increases. As the engine speed Ne becomes higher, a grace period until fuel injected into the cylinder evaporates becomes shorter. Therefore, the amount of unvaporized fuel WE becomes larger.

Figure 4:
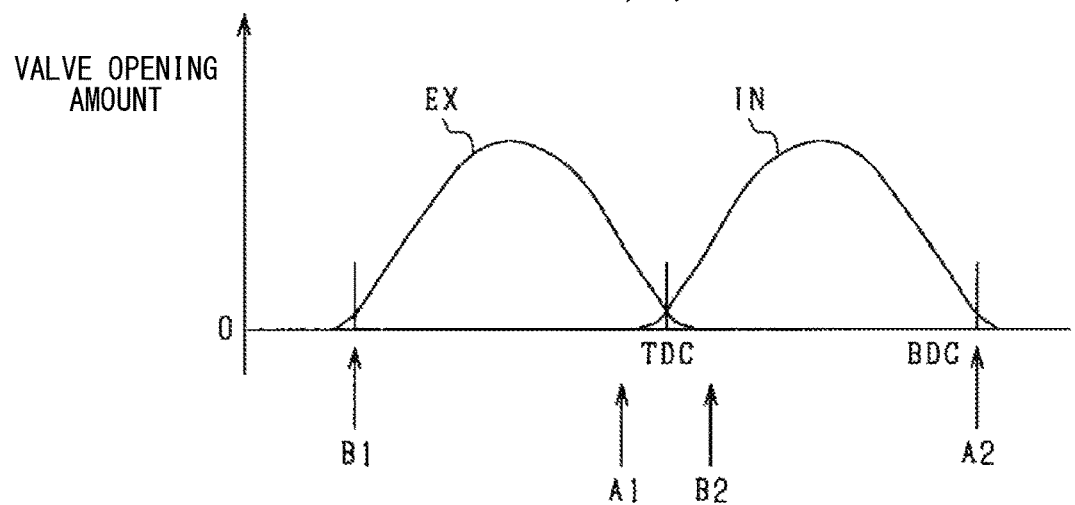
FIG. 4 is a view showing a first control and a second control.
Figure 4:
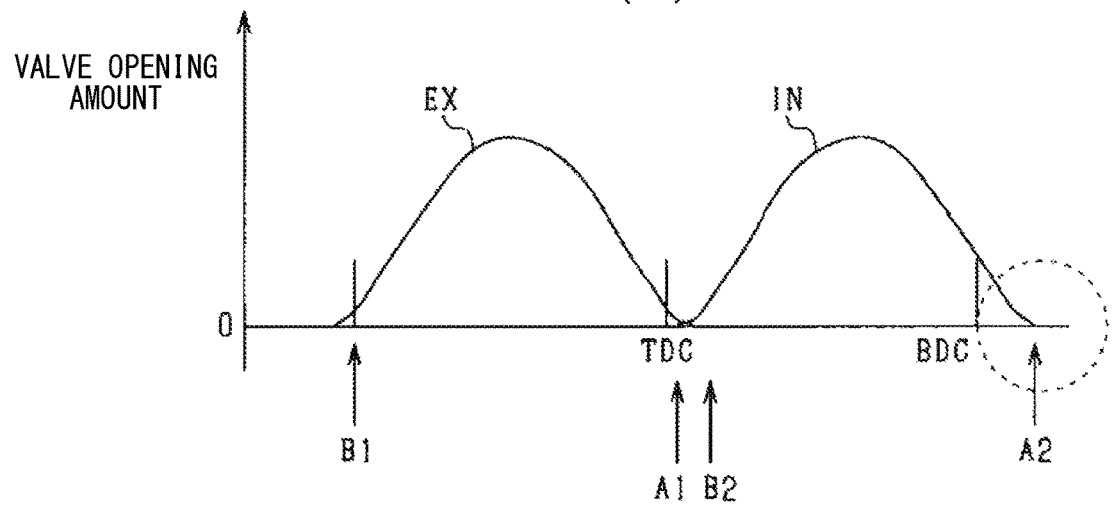
Figure 4:
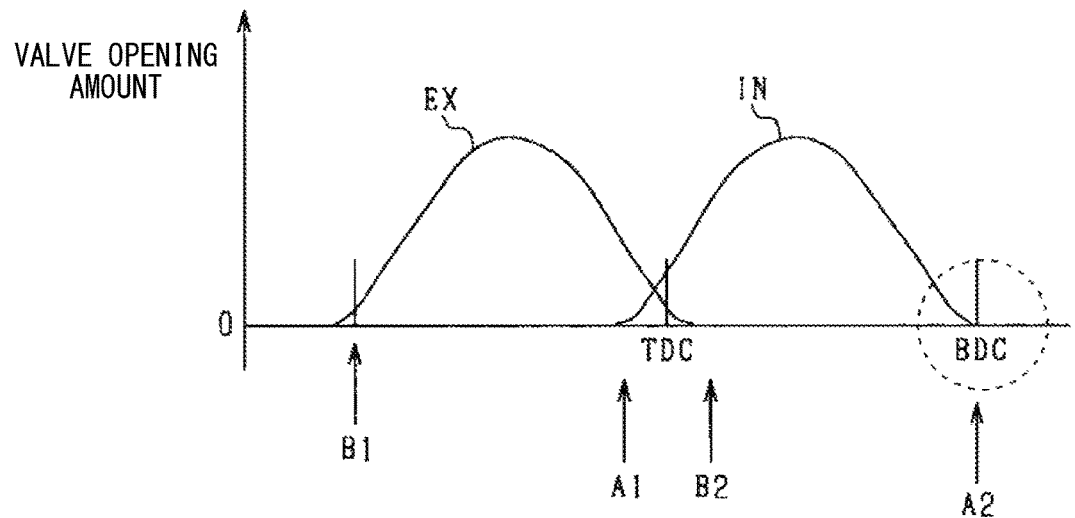

Next, a control of the opening timing and the closing timing of the intake and exhaust valves 31 and 32 when the inside of the cylinder is determined to be in the wet concerned state or in the liquid particle float state will be described with reference to FIG. 4. FIG. 4 shows a transition of the valve opening amount IN of the intake valve 31 and a transition of the valve opening amount EX of the exhaust valve 32, the vertical axis shows a valve opening amount, and the horizontal axis shows a transition of time.

In this embodiment, as shown in (a) in FIG. 4, when the inside of the cylinder is in the normal state where it is not necessary to take into account of the wet concerned state and the liquid particle float state, an opening time A1 of the intake valve 31 is set to the advance angle side of the top dead center (hereinafter referred to as TDC), and the closing time A2 is set to the retard side of the bottom dead center (hereinafter referred to as BDC). Further, in the present embodiment, in the normal state, the opening time B1 of the exhaust valve 32 is set to the retard side of the BDC, and the closing time B2 is set to the advance side of the TDC. Hereinafter, the control of the opening timing and the closing timing of the intake valve 31 and the exhaust valve 32, which is performed in the normal state, is referred to as a normal control.

The wet concerned state is a state in which the unvaporized fuel amount WE is high, and therefore, reducing the fuel injection amount Q is effective in improving the wet concerned state. Therefore, when the ECU 40 determines that the inside of the cylinder is in the wet concerned state, the ECU 40 performs the first control for reducing the intake air amount Ga, as the control of the opening timing and the closing timing of the intake valve 31 or the exhaust valve 32 by using the variable valve devices 33 and 34. The ECU 40 corresponds to a first control unit.

In this embodiment, as shown in (b) in FIG. 4, a late closing control is performed as the first control such that the variable valve device 33 retards the closing time A2 of the intake valve 31 to be farther from the BDC than the closing time A2 under the normal control. In this way, in the intake stroke, the amount of intake air Ga filled in the cylinder is lower than that when the first control is not performed. Therefore, the fuel injection amount Q computed by using the intake air amount Ga decreases. It is noted that, an early closing control may be performed as the first control such that the variable valve device 33 advances the closing time A2 of the intake valve 31 to be farther from the BDC than the closing time A2 under the normal control.

Vaporization of floating liquid particle contained in air-fuel mixture is promoted as the temperature inside the cylinder increases. Therefore, increasing of the in-cylinder temperature is effective to improve the liquid particle float state. Therefore, the ECU 40 performs a second control to increase the in-cylinder temperature as a control of the opening timing and the closing timing of the intake and exhaust valves 31 and 32 by using the variable valve devices 33 and 34. The ECU 40 corresponds to a second control unit.

As shown in (c) in FIG. 4, the ECU 20 changes, as the second control, the opening timing and the closing timing of the intake valve 31 such that the variable valve device 33 causes the closing time A2 of the intake valve 31 to be closer to the BDC than the closing time A2 under the normal control. In the present embodiment, the closing time A2 of the intake valve 31 is advanced so as to be closer to the BDC than the closing time A2 under normal control. In this way, the actual compression ratio increases in the compression stroke of the engine 10, so that the temperature inside the cylinder increases, and floating liquid particle can be easily vaporized.

Figure 5:
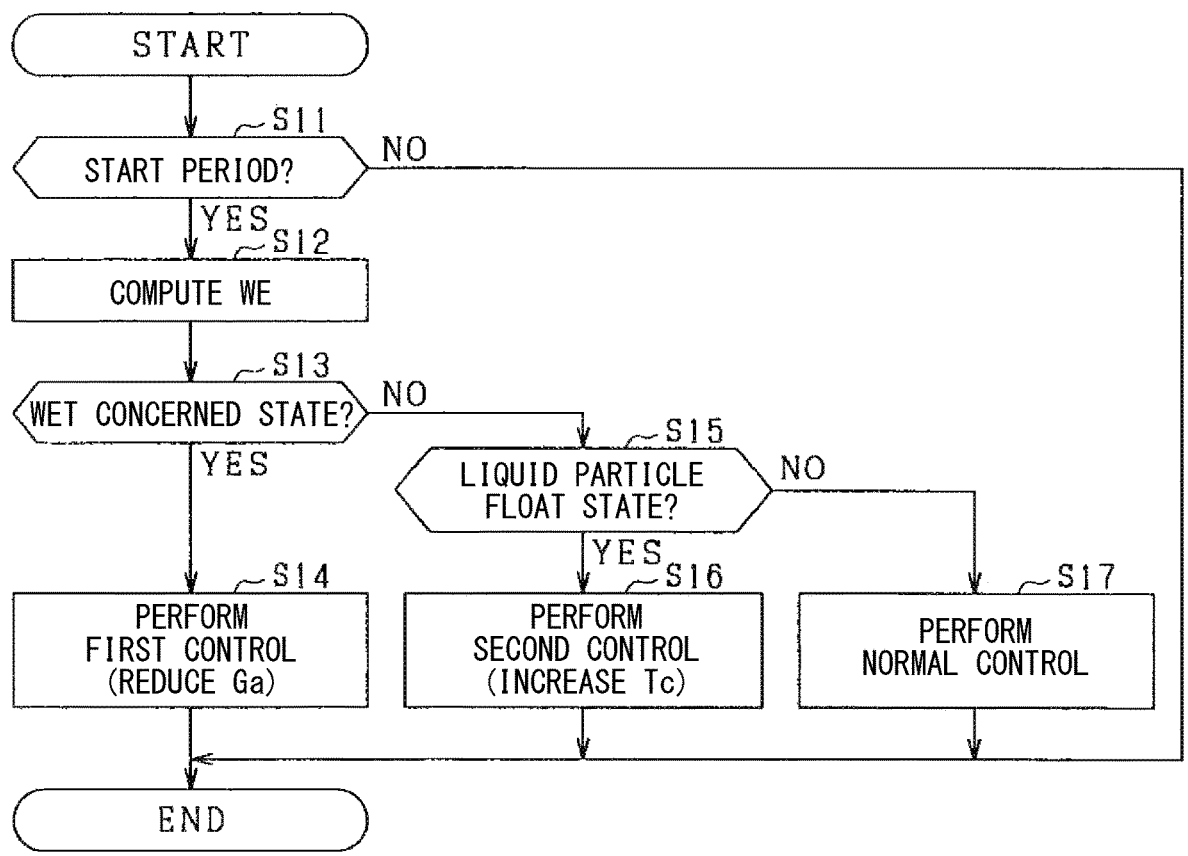
FIG. 5 is a flowchart showing a procedure of a start control of an engine.

Next, the procedure of the start control for the engine 10 will be described with reference to FIG. 5. The process shown in FIG. 5 is repeatedly executed by the ECU 40 in a predetermined cycle period.

In step S11, it is determined whether or not it is in the start period that is from the starting of the engine 10 to a time at which a predetermined period has elapsed. Specifically, it is determined whether or not it is in a period from start of cranking of the engine 10 by using the starter 50 caused by IG ON to end of warm up of the catalytic converters 25 and 26. For example, determination whether or not the warm up of the catalytic converters 25 and 26 has been completed may be made by determining whether or not a predetermined time has elapsed from the starting of the engine 10.

In step S12, the unvaporized fuel amount WE is computed as shown in (a) to (c) in FIG. 3. In step S13, it is determined whether or not the inside of the cylinder is in the wet concerned state by using the unvaporized fuel amount WE computed in step S13.

When it is determined that the inside of the cylinder is in the wet concerned state, the process proceeds to step S14, and the first control is performed. By the first control, the closing time A2 of the intake valve 31 is retarded from the BDC by the variable valve devices 33 and 34 compared to the closing time A2 in the normal control, and the intake air amount Ga is reduced. In this way, the fuel injection amount Q is reduced, and the fuel wet in the cylinder is reduced.

When it is determined in step S13 that the inside of the cylinder is not in the wet concerned state, the process proceeds to step S15. In step S15, it is determined whether or not the inside of the cylinder is in the liquid particle float state by using the unvaporized fuel amount WE computed in step S12. When it is determined in step S15 that the inside of the cylinder is in the liquid particle float state, the process proceeds to step S16.

In step S16, the second control is performed. By the second control, the closing time A2 of the intake valve 31 is brought closer to the BDC than the closing time A2 in the normal control, and the actual compression ratio in the compression stroke of the engine 10 increases. In this way, the temperature Tc in the cylinder rises, and the amount of floating liquid particle in the cylinder decreases. In the present embodiment, in the period from the start of the engine 10 to the end of the cranking by using the starter 50, the determination of the first wet concerned state or the determination of the liquid particle float state is performed, and the first and second controls according to the determination result are performed. In this way, the first and second controls can be started before first explosion of the engine 10 occurs. Therefore, the effect of improving the wet concerned state or the liquid particle float state can be enhanced.

When it is determined in step S15 that the inside of the cylinder is not in the liquid particle float state, the process proceeds to step S17. In the case where the process proceeds to step S17, the inside of the cylinder is in the normal state. Therefore, the normal control for fixing the opening timing and the closing timing of the intake valve 31 is performed. Then, the series of processes shown in FIG. 5 is terminated.

Next, with reference to FIG. 6, the transition of the operating state at the start of the engine 10 will be described.

At time t1, a start request command is input to the ECU 40 as the driver turns the IG ON. In response, in the period of time t1-t2, the crankshaft 28 is given an initial rotation by cranking the starter 50. The intake air amount Ga increases due to the flow of air in the intake passage 12 according to the engine speed Ne (cranking speed).

Figure 6:
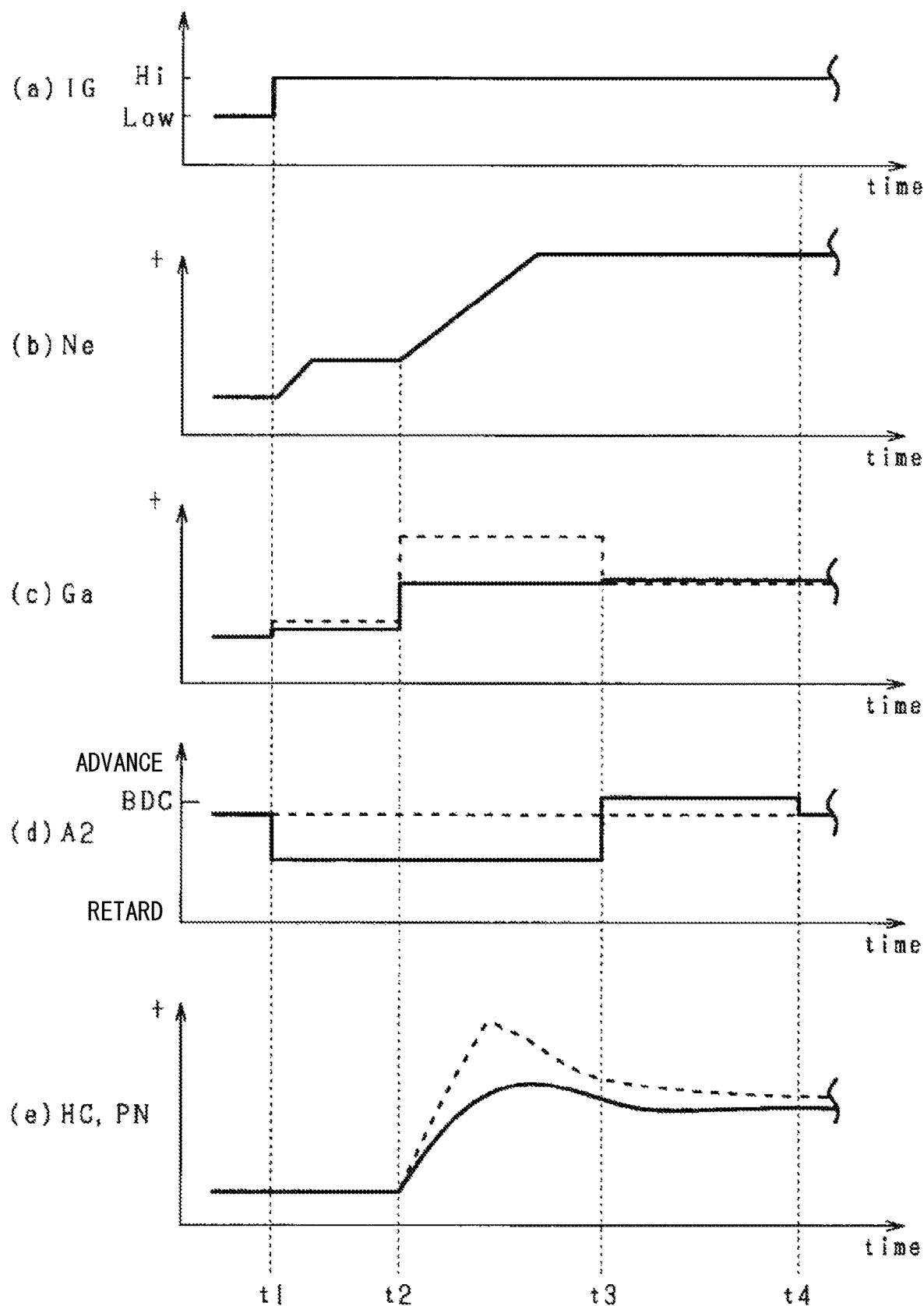
FIG. 6 is a timing chart for explaining a transition of an operating state at the time of starting of the engine.

In FIG. 6, it is determined that the inside of the cylinder is in the wet concerned state in the period of time t1-t2. Therefore, the closing time A2 of the intake valve 31 is retarded from the BDC by the first control compared to the closing time A2 in the normal control. At time t2, the first explosion of the engine 10 occurs, and the engine speed Ne increases.

After the first explosion of the engine 10, the engine speed Ne increases above the cranking speed, and the intake air amount Ga increases. At this time, the closing time A2 of the intake valve 31 is retarded more than that of the BDC. Therefore, increase in the intake air amount Ga is suppressed. In (c) in FIG. 6, the intake air amount Ga shown by the broken line indicates the intake air amount Ga at the closing time A2 of the intake valve 31 caused by the normal control. By suppressing the increase in the intake air amount Ga, the fuel injection amount Q computed by the ECU 40 becomes smaller than the fuel injection amount Q in the normal control. Therefore, the amount of HC and PN in the exhaust gas is reduced as compared with that in the case where normal control is performed. In (e) in FIG. 6, the emission amount of HC and PN shown by the broken line indicates the emission amount of HC and PN under the normal control.

After that, the intake air amount Ga becomes the adjustment amount of the throttle valve 16. Thus, the fuel injection amount Q decreases, and the unvaporized fuel amount WE decreases. In the present embodiment, after time t3, the inside of the cylinder is determined to be in the liquid particle float state. Therefore, the second control is performed in which the closing time of the intake valve 31 is closer to the BDC than the closing time A2 in the normal control. In this way, the actual compression ratio increases in the compression stroke of the engine 10, and the in-cylinder temperature Tc increases. Therefore, the amount of HC and PN in exhaust gas is reduced as compared with that in the case where the normal control is performed. It is conceivable that the intake air amount Ga increases as the actual compression ratio increases. It is noted that, the increase in the intake air amount Ga is suppressed by a reduction correction of the opening degree of the throttle valve 16. In (c) in FIG. 6, for convenience of explanation, after the time t3, the intake air amount Ga in the normal control and the intake air amount Ga in the second control are shown in a shifted state.

After that, as the in-cylinder temperature Tc increases, the amount of floating liquid particle in the cylinder decreases. Then, at time t4, the warm up of the catalytic converters 25 and 26 is completed, and the start control for the engine 10 is completed.

According to the first embodiment described above, the following effects can be produced.

When the engine 10 is started, the ECU 40 determines whether the inside of the cylinder is in the wet concerned state in which there is a concern about fuel wet, or the inside of the cylinder is in the liquid particle float state in which a large volume of floating liquid particle of fuel arise. Then, when it is determined that it is in the wet concerned state, the first control for reducing the intake air amount Ga is performed as the control of the opening timing and the closing timing by using the variable valve devices 33 and 34. In this way, the fuel injection amount Q is reduced, and therefore, wet fuel in the cylinder is reduced. Thus, HC and PN in exhaust gas can be reduced. Further, when it is determined that it is in the floating liquid particle, the second control for increasing the in-cylinder temperature Tc is performed as the control of the opening timing and the closing timing by using the variable valve devices 33 and 34. In this way, fuel in the cylinder is easily vaporized, and therefore, fuel in the form of liquid particle is reduced, and HC and PN in exhaust gas can be reduced. As described above, the configuration enables to perform the appropriate treatment for reducing HC and PN according to the state of fuel in the cylinder. Therefore, the effect of reducing HC and PN in exhaust gas can be enhanced.

The ECU 40 computes the amount of unvaporized fuel WE in the cylinder based on at least one of the temperature of the engine 10, the fuel injection amount Q, and the fuel pressure Pf. Then, based on the computed unvaporized fuel amount WE, the wet concerned state and the liquid particle float state are determined. In this way, the wet concerned state and the liquid particle float state can be easily determined according to the operating state of the engine 10.

Modification of First Embodiment

The ECU 40 may perform a control, as the second control, for increasing a valve overlap period in which both the intake valve 31 and the exhaust valve 32 are opened.

Figure 7:
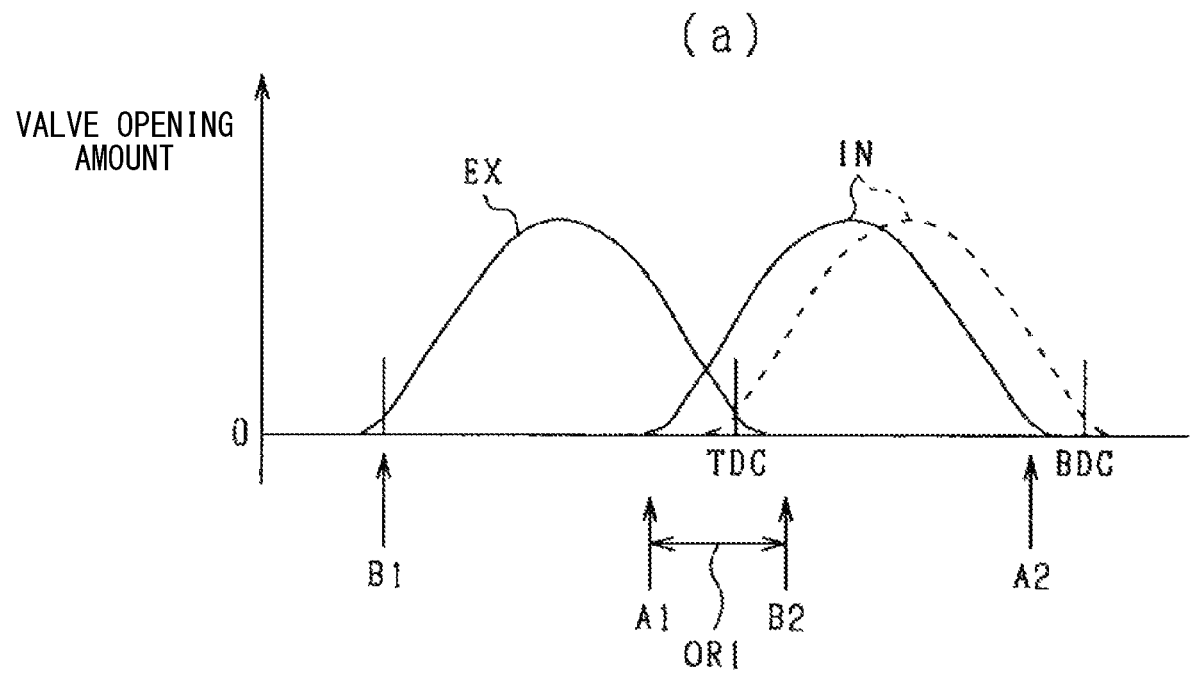
FIG. 7 is a view showing the second control according to a modified example.
Figure 7:
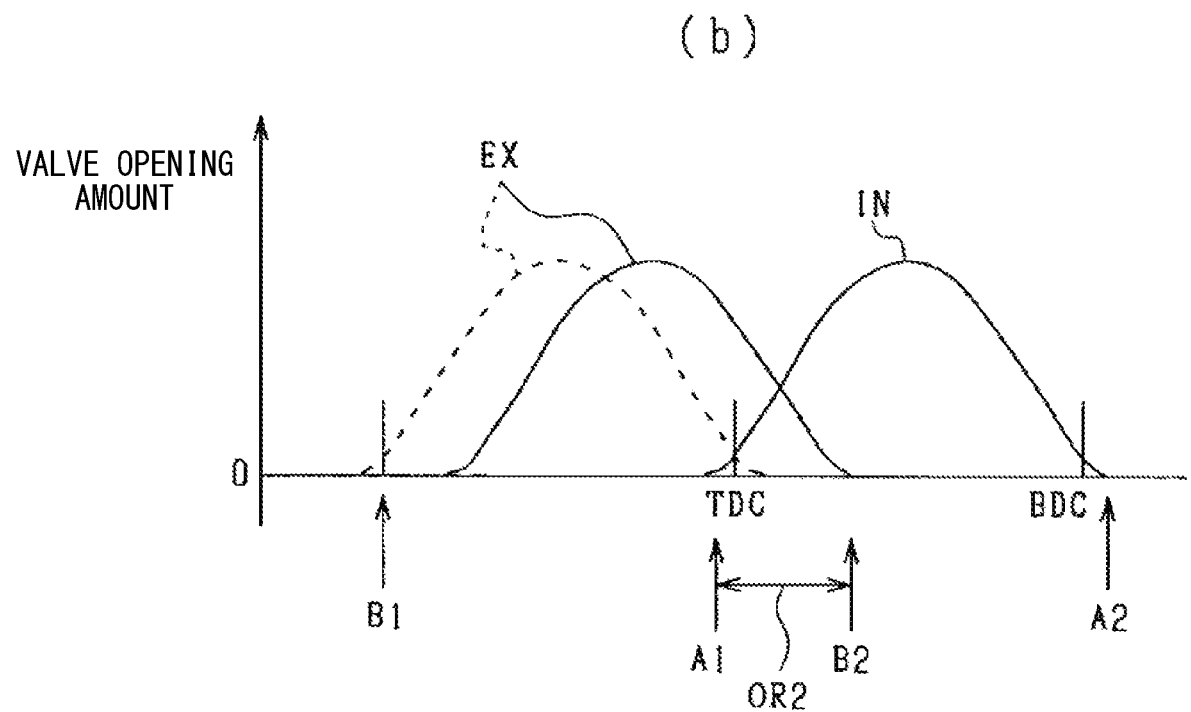

In FIG. 7, the transition of the valve opening amount of each of the intake and exhaust valves 31 and 32 in the normal control is shown by a broken line, and the transition of the valve opening amount after the opening timing and the closing timing is changed by the second control is shown by a solid line. In (a) in FIG. 7, the ECU 40, as the second control, advances the opening time A1 of the intake valve 31 relative to the TDC from the opening time A1 under normal control. In this way, the valve overlap period OR1 in which both the intake valve 31 and the exhaust valve 32 are opened is increased. In this valve overlap period OR1, internal EGR is generated in which exhaust gas flowing out from the inside of the cylinder into the exhaust passage 23 flows into the cylinder again from the exhaust port. In this way, the temperature Tc in the cylinder increases, and floating liquid particle in the cylinder can be easily vaporized.

In (b) in FIG. 7, the ECU 40, as the second control, retards the closing time B2 of the exhaust valve 32 relative to the TDC from the closing time B2 under normal control. In this way, the valve overlap period OR2 in which both the intake valve 31 and the exhaust valve 32 are opened is increased. In this valve overlap period OR2, internal EGR occurs in which exhaust gas discharged from the inside of the cylinder to the exhaust passage 23 returns to the inside of the cylinder again. In this way, the temperature Tc in the cylinder increases, and floating liquid particle in the cylinder can be easily vaporized.

This modification also provides the similar effects as the first embodiment.

The ECU 40 may determine whether the inside of the cylinder is in the wet concerned state or whether the inside of the cylinder is in the liquid particle float state in a period after the engine 10 is stopped until the engine 10 is started. In this case, for example, the ECU 40 computes the unvaporized fuel amount WE by using the cooling water temperature Tw or the fuel pressure Pf after an ISS restart control performs automatic stop. Further, based on this computed unvaporized fuel amount WE, the ECU 40 determines whether the inside of the cylinder is in the wet concerned state or in the liquid particle float state. Then, at the time when the ISS restarts, the first or second controls may be performed according to the state of the cylinder that has already been determined. In the present embodiment, the first or second controls can be performed at the same time as the start of the engine 10. Therefore, the effect of improving the wet concerned state or the liquid particle float state can be enhanced.

Second Embodiment

A second embodiment is different from the first embodiment as described below. The configurations with the same reference numerals as those in the first embodiment show the same configurations, and the description thereof will not be repeated.

Figure 8:
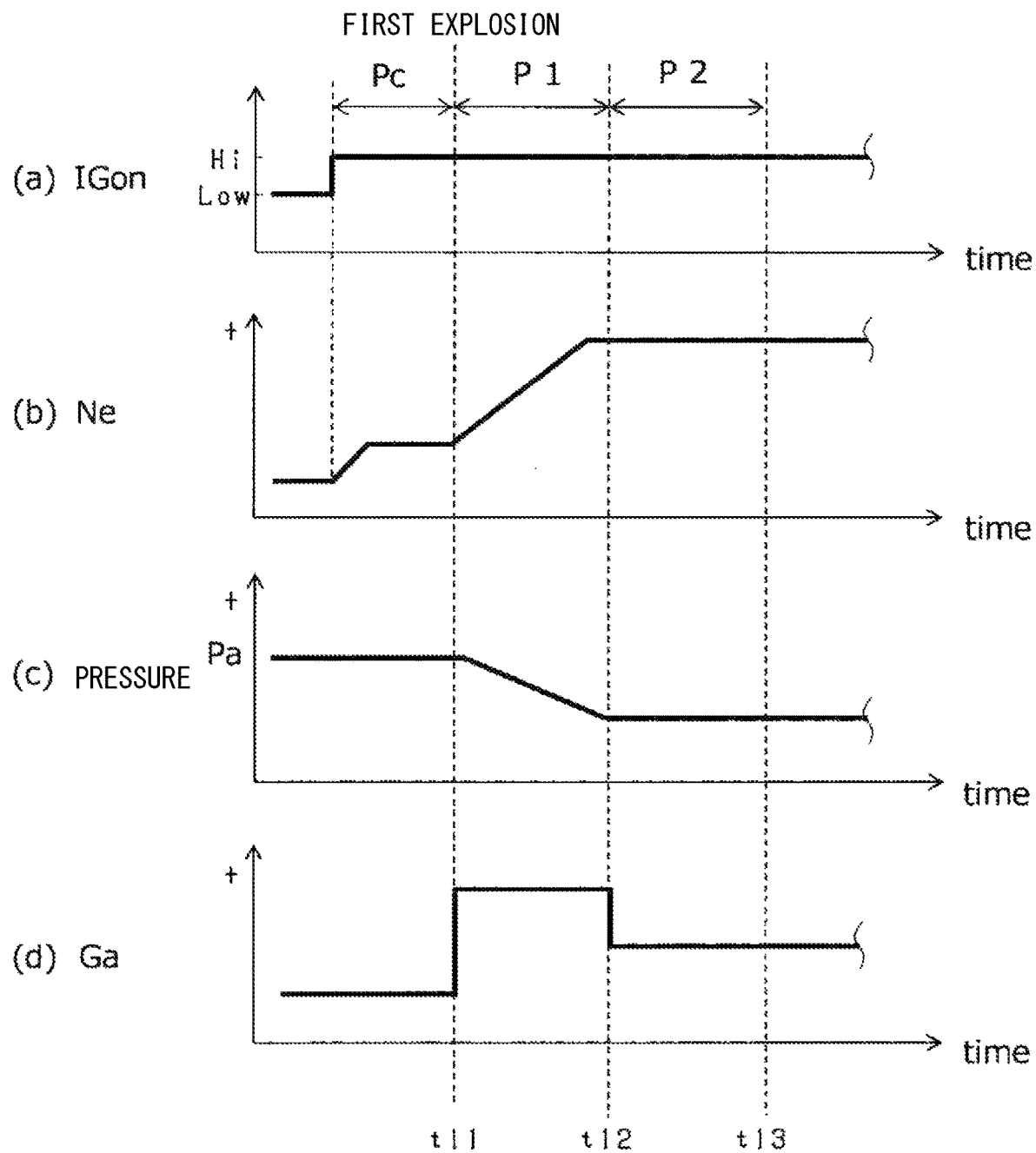
FIG. 8 is a timing chart showing a transition of an operating state of an engine according to a second embodiment.

For a while from the start of the engine 10, the pressure in the intake passage 12 is equivalent to the atmospheric pressure. Therefore, the intake air amount Ga increases. When the intake air amount Ga reaches the adjustment amount of the throttle valve 16, the intake air amount Ga decreases. In FIG. 8, during the cranking period P0 of the engine 10, the pressure in the intake passage 12 is the atmospheric pressure Pa, and after the first explosion occurs at time t11, the pressure in the intake passage 12 decreases from the atmospheric pressure.

Therefore, in the present embodiment, the ECU 40 determines that it is in the wet concerned state when it is the first period P1 including the start time when the intake air amount Ga increases. When it is the second period P2 following the first period P1, it is determined to be in the liquid particle float state.

Figure 9:
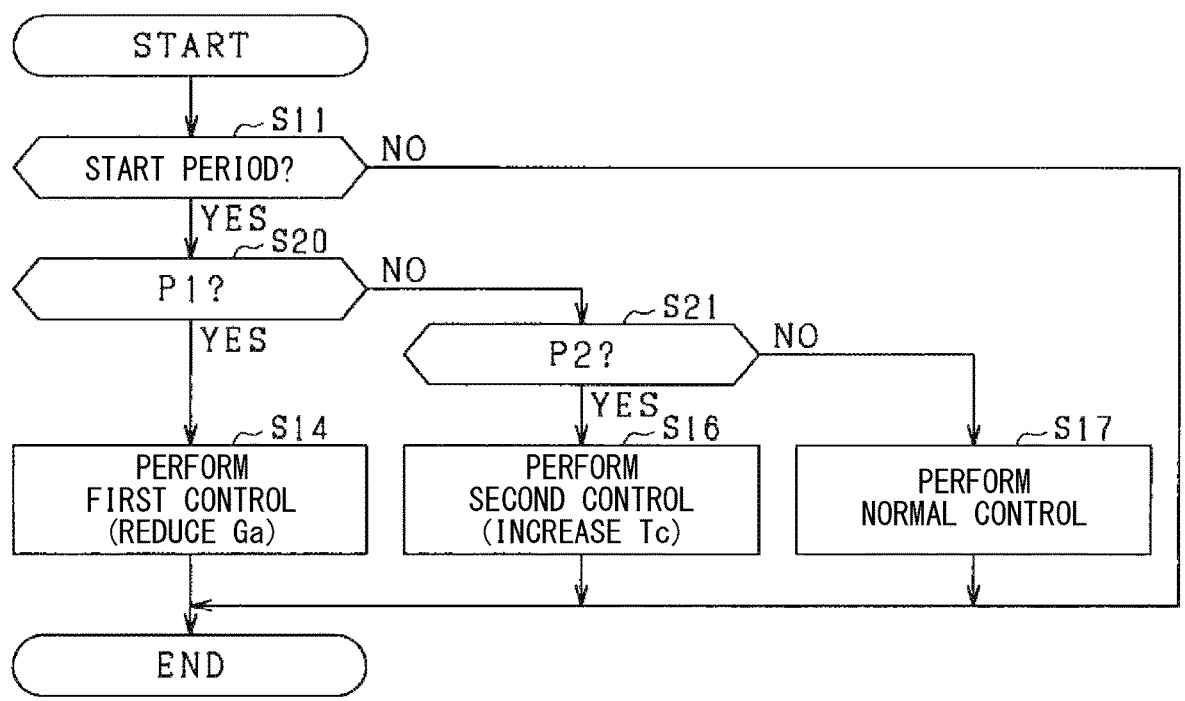
FIG. 9 is a flowchart showing a procedure of a start engine control of the engine.

Next, the procedure of the start control for the engine 10 according to the present embodiment will be described with reference to FIG. 9. The process shown in FIG. 9 is repeatedly executed by the ECU 40 in a predetermined cycle period.

When it is determined in step S11 that it is in the start period of the engine 10, the process proceeds to step S20, and it is determined whether or not the engine 10 is in the first period P1. The first control reduces the intake air amount Ga of the engine 10. Therefore, in the start period of the engine 10, this adversely affects the increase in the engine rotation speed Ne from the cranking rotation speed. Therefore, it is desirable to limit the implementation of the first control to a short period as much as possible. Therefore, after the engine 10 is given its initial rotation by the starter 50, the period of one combustion cycle after the first explosion occurs in the engine 10 is defined as the first period P1 in which the first control is performed. The period of the first one combustion cycle after the end of cranking is the period of 720° CA from the first explosion, and one combustion is performed in each cylinder in this period. In the present embodiment, the period of the first combustion cycle after the end of cranking corresponds to the first period P1.

When it is determined in step S11 that it is the first period P1, the process proceeds to step S14, and the first control for controlling the opening timing and the closing timing of the intake valve 31 is performed. Therefore, in the present embodiment, the first control is always performed at the beginning of the starting of the engine 10.

When it is determined in step S20 that it is not the first period P1, the process proceeds to step S21, and it is determined whether or not it is the second period P2 that is the period of the second combustion cycle after the first explosion. When the affirmative determination is made in step S21, the process proceeds to step S16, and the second control is performed.

Further, in step S21, when it is determined that it is not the period of the second combustion cycle after the end of the cranking, the process proceeds to step S17, and the normal control that does not change the opening timing and the closing timing of the intake valve 31 and the exhaust valve 32 is performed. Then, the series of the processes shown in FIG. 9 is terminated.

According to the present embodiment described above, the following effects can be achieved.

The ECU 40 determines that it is in the wet concerned state when it is in the first period P1 including the start of the engine 10. The ECU 40 determines that the it is in the liquid particle float state when it is in the second period following the first period P1. In this way, the first control and the second control are executed in order, and therefore, the effect of improving the wet state in the cylinder can be enhanced.

The ECU 40 determines the wet concerned state in the period of the first combustion cycle after the first explosion of the engine 10 as the first period P1 after the engine 10 is given the initial rotation by the starter 50.

Further, the ECU 40 determines the liquid particle float state in the period following the period of the one combustion cycle after the first explosion of the engine 10 as the second period P2. In this way, the configuration enables to limit the period for executing the first control to the period of the one combustion cycle after the first explosion of the engine 10. Therefore, the configuration enables to shorten the time required for the engine rotation speed Ne to rise to the predetermined value when the engine 10 is started and to improve the startability of the engine 10.

Third Embodiment

A third embodiment is different from the first embodiment as described below. The configurations with the same reference numerals as those in the first embodiment show the same configurations, and the description thereof will not be repeated.

Figure 10:
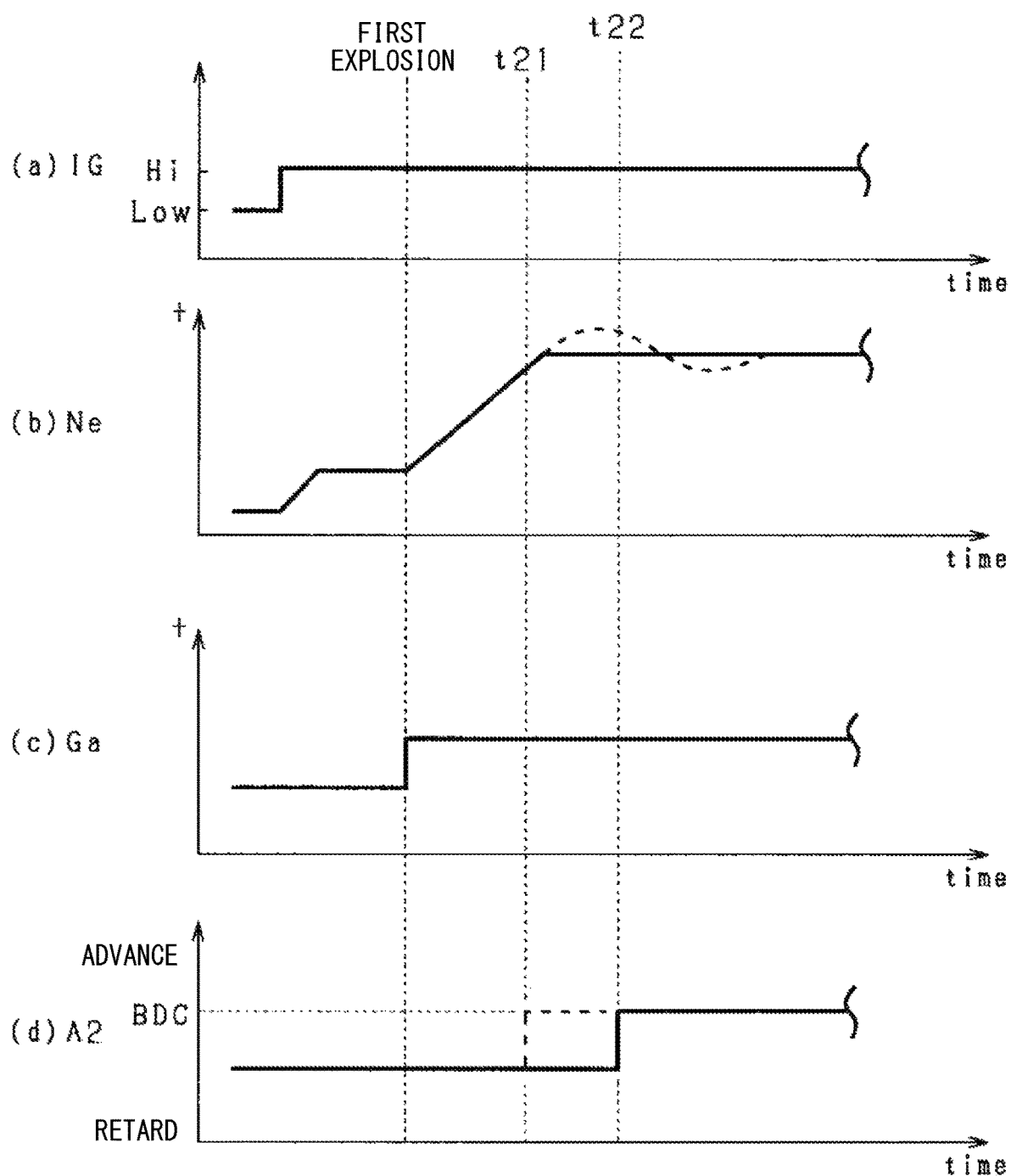
FIG. 10 is a timing chart showing a change in engine speed.

When the engine 10 is restarted with the ISS restart control, it is necessary to minimize the vibration of the engine 10 during the starting period. For example, if the engine rotation speed Ne fluctuates significantly during the restart with the ISS restart control, there is a concern that the driver may be more likely to notice this fluctuation. In FIG. 10, the actual compression ratio is increased with the second control at time t21 in the period of increase in the engine speed Ne after the first explosion. Therefore, after that, an overshoot occurs in the engine rotation speed Ne.

On the other hand, when the engine 10 is restarted with the ISS restart control, it is highly possible that the catalytic converters 25 and 26 have already been activated by warming up. Therefore, in the present embodiment, when the engine 10 is restarted with the ISS restart control, priority is given to suppressing fluctuations in the engine rotation speed Ne. Further, after waiting for the engine speed Ne to stabilize (time t22 in FIG. 10), the second control is performed.

Figure 11:
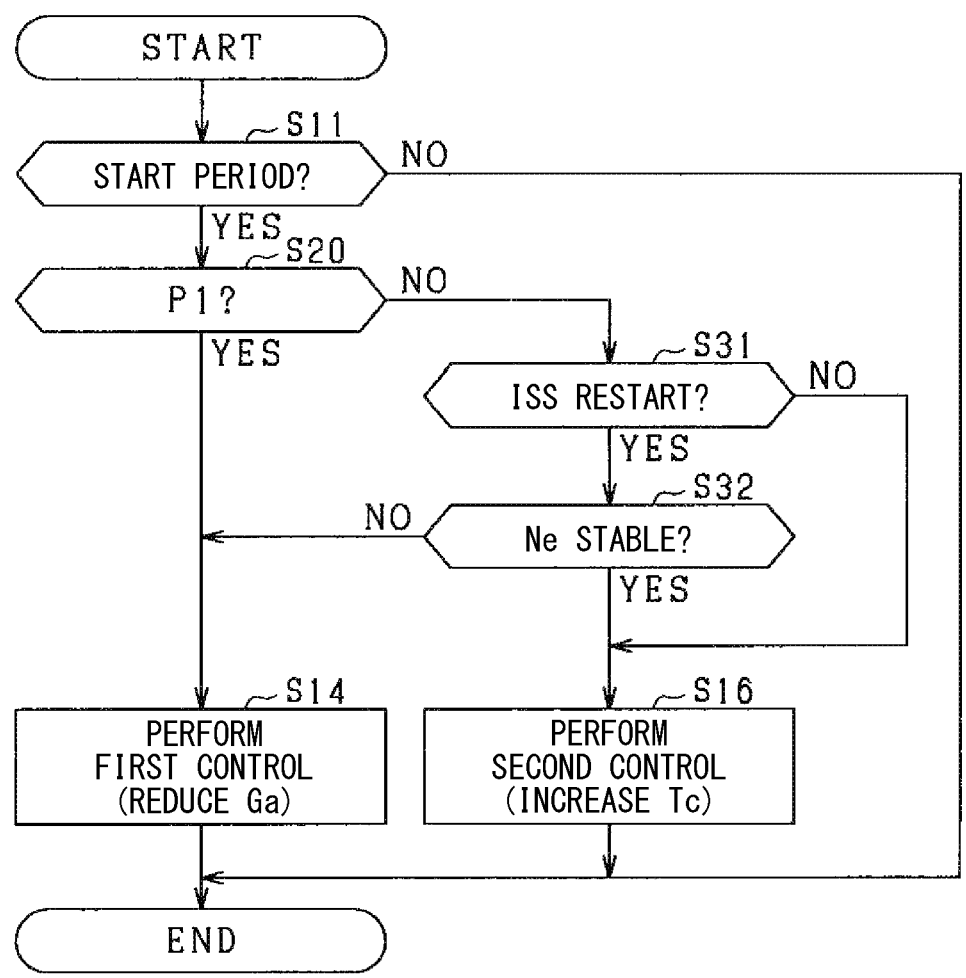
FIG. 11 is a flowchart showing a procedure for a start control of the engine according to a third embodiment.

Next, the procedure of the start control for the engine 10 according to the present embodiment will be described with reference to FIG. 11. The process shown in FIG. 11 is repeatedly executed by the ECU 40 in a predetermined cycle period.

When it is determined in step S11 that it is in the start period of the engine 10, the process proceeds to step S20, and it is determined whether or not the engine 10 is in the first period P1. Also in this embodiment, the period of one combustion cycle after the end of the cranking is defined as the first period P1. When it is in the first period P1, the process proceeds to step S14, and the first control for controlling the opening timing and the closing timing of the intake valve 31 is performed.

In step S20, when it is not in the first period P1, the process proceeds to step S31, and it is determined whether or not the engine 10 is restarted with the ISS restart control. When the engine 10 is not started with the ISS restart control, the process proceeds to step S16 to perform the second control. In this case, the period following the period of the one combustion cycle after the occurrence of the first explosion is defined as the second period P2.

When the affirmative determination is made in step S31, the process proceeds to step S32, and it is determined whether or not the engine rotation speed Ne is stable. In the present embodiment, a difference between an engine rotation speed Ne (n−1) acquired in the previous computation cycle and an engine rotation speed Ne (n) acquired in the current computation cycle is computed as a rotation speed difference ΔV. Then, when the computed rotation speed difference ΔV is equal to or less than a predetermined speed difference determination value, it is determined that the engine rotation speed Ne is stable. On the other hand, when the rotation speed difference ΔV is larger than the speed determination value, it is determined that the engine rotation speed Ne is not stable.

When the negative determination is made in step S32, the process proceeds to step S14, and the first control is performed. Therefore, the reduction of the intake air amount Ga of the engine 10 with the first control is continued. The reduction of the intake air amount Ga of the engine 10 with the first control is continued, thereby to enable to suppress an increase in the engine rotation speed Ne, and the stabilization of the engine rotation speed Ne can be accelerated.

After that, every time the process of FIG. 11 is performed, it is determined in step S32 whether or not the engine rotation speed Ne is stable. Then, in step S32, when it is determined that the engine rotation speed Ne is stable, the process proceeds to step S16, and the second control is performed. Then, the series of the processes shown in FIG. 11 is terminated.

According to the present embodiment described above, the following effects can be achieved.

After the initial rotation is given to the engine 10 in the starter 50 that rotates the crankshaft 28 of the engine 10, the ECU 40 determines the wet concerned state with the period until the rotation speed of the engine 10 becomes stable as the first period P1. Further, the ECU 40 determines the liquid particle float state in the period after the engine rotation speed Ne becomes stable as the second period P2. In this way, the configuration enables to reduce the emissions of HC and PN while suppressing excessive fluctuations in the engine rotation speed Ne when the engine 10 is started.

When the engine 10 is restarted with the ISS restart control, the ECU 40 determines the wet concerned state in the period until the engine rotation speed Ne becomes stable as the first period P1. Further, the ECU 40 determines the liquid particle float state in the period after the engine rotation speed Ne becomes stable as the second period P2. When the engine 10 is not restarted with the ISS restart control, the wet concerned state is determined in the period of the one combustion cycle after the first explosion of the engine 10 as the first period P1. Further, the ECU 40 determines the liquid particle float state in the period following the period of the one combustion cycle after the first explosion as the second period P2. In this way, this configuration enables to suppress the driver from feeling uncomfortable due to the excessive fluctuation of the engine rotation speed Ne in the restart control, and to reduce the emissions of HC and PN at the same time.

Modification of Third Embodiment

When the engine 10 is restarted, regardless of performing the ISS restart control or not, the ECU 40 may determine the wet concerned state in the period until the engine speed Ne becomes stable as the first period P1 and may determine the liquid particle float state in the period after the engine rotation speed Ne becomes stable as the second period P2. In this case, step S31 of FIG. 11 may be deleted. Therefore, when negative determination is made in step S20, the process may proceed to step S32 and may determine whether or not the engine rotation speed Ne is in a stable state.

Other Embodiments

The engine 10 may be configured to include only the variable valve device 33 that controls only the opening timing and the closing timing of the intake valve 31. In this case, as the second control, the ECU 40 may control the closing time of the intake valve 31 to be closer to the BDC or may advance the opening time A1 of the intake valve 31. In this way, the ECU 40 may perform a control to increase the valve overlap period OR1 in which both the intake valve 31 and the exhaust valve 32 are opened.

The start period in which the ECU 40 performs the first control and the second control may be from the start of the cranking with the starter 50 to elapse of a predetermined period, regardless of the activity of the catalytic converters 25 and 26. In this case, the ECU 40 may determine in step S11 whether or not it is in the start period based on elapse of time from the start of the cranking with the starter 50.

The ECU 40 may determine whether the inside of the cylinder is in the wet concerned state or the inside of the cylinder is in the liquid particle float state on condition that the engine 10 is cold-started.

The engine 10 may be an internal combustion engine of a port injection type.

Although the disclosure has been described in accordance with the embodiments, it is understood that the present disclosure is not limited to such embodiment or structures. The present disclosure encompasses various modifications and variations within the scope of equivalents. In addition, while the various combinations and configurations, which are preferred, other combinations and configurations, including more, less or only a single element, are also within the spirit and scope of the present disclosure.

What is claimed is:

1. A control device for an internal combustion engine, the internal combustion engine including a fuel injection valve configured to inject fuel into a cylinder and a variable valve device configured to change an opening timing and a closing timing of at least an intake valve among the intake valve and an exhaust valve, the control device for the internal combustion engine configured to control a fuel injection amount based on an intake air amount of the internal combustion engine and control the opening timing and the closing timing of the intake valve with the variable valve device based on an operating state of the internal combustion engine, the control device for the internal combustion engine comprising:

a computation unit configured to compute an amount of unvaporized fuel generated in the cylinder based on at least one of a temperature of the internal combustion engine, a fuel injection amount of the fuel injection valve, or a fuel pressure of fuel supplied to the fuel injection valve;

a determination unit configured to determine whether an inside of a cylinder is in a wet concerned state in which fuel wet is concerned or the inside of the cylinder is in a liquid particle float state in which a large volume of floating liquid particle of fuel arise based on the amount of unvaporized fuel generated in the cylinder and computed by the computation unit, when the internal combustion engine is started;

a first control unit configured to perform, as a control of the opening timing and the closing timing with the variable valve device, a first control to reduce the intake air amount when the determination unit determines that the inside of the cylinder is in the wet concerned state; and a second control unit configured to perform, as the control of the opening timing and the closing timing with the variable valve device, a second control to raise an in-cylinder temperature when the determination unit determines that the inside of the cylinder is in the liquid particle float state.

2. A control device for an internal combustion engine, the internal combustion engine including a fuel injection valve configured to inject fuel into a cylinder and a variable valve device configured to change an opening timing and a closing timing of at least an intake valve among the intake valve and an exhaust valve, the control device for the internal combustion engine configured to control a fuel injection amount based on an intake air amount of the internal combustion engine and control the opening timing and the closing timing of the intake valve with the variable valve device based on an operating state of the internal combustion engine, the control device for the internal combustion engine comprising:

a determination unit configured to determine whether an inside of a cylinder is in a wet concerned state in which fuel wet is concerned or the inside of the cylinder is in a liquid particle float state in which a large volume of floating liquid particle of fuel arise, when the internal combustion engine is started;

a first control unit configured to perform, as a control of the opening timing and the closing timing with the variable valve device, a first control to reduce the intake air amount when the determination unit determines that the inside of the cylinder is in the wet concerned state; and a second control unit configured to perform, as the control of the opening timing and the closing timing with the variable valve device, a second control to raise an in-cylinder temperature when the determination unit determines that the inside of the cylinder is in the liquid particle float state, wherein a first period is a period of one combustion cycle from first explosion of the internal combustion engine after the internal combustion engine is initially rotated with a starting device to rotate an output shaft of the internal combustion engine, a second period follows the period of the one combustion cycle after the first explosion, and the determination unit is configured to determine that the inside of the cylinder is in the wet concerned state in the first period and determine that the inside of the cylinder is in the liquid particle float state in the second period.

3. The control device for the internal combustion engine according to claim 2, wherein the determination unit is configured to determine that the inside of the cylinder is in the wet concerned state in a period, as the first period, after the internal combustion engine is initially rotated with the starting device to rotate the output shaft of the internal combustion engine until a rotation speed of the internal combustion engine becomes stable and determine that the inside of the cylinder is in the liquid particle float state in a period, as the second period, after the rotation speed of the internal combustion engine becomes stable.

4. The control device for the internal combustion engine according to claim 3, further comprising:

a restart control unit configured to automatically stop the internal combustion engine when a predetermined automatic stop condition is satisfied and subsequently to automatically start the internal combustion engine when a predetermined restart condition is satisfied, wherein the determination unit is configured to, on condition that the internal combustion engine is started by the restart control unit, determine that the inside of the cylinder is in the wet concerned state in a period, as the first period, until the rotation speed of the internal combustion engine becomes stable and determine that the inside of the cylinder is in the liquid particle float state in a period, as the second period, after the rotation speed of the internal combustion engine becomes stable, and the determination unit is configured to, on condition that the internal combustion engine is not started by the restart control unit, determine that the inside of the cylinder is in the wet concerned state in a period, as the first period, that is a period of one combustion cycle after first explosion of the internal combustion engine and determine that the inside of the cylinder is in the liquid particle float state in a period, as the second period, following the period of the one combustion cycle after the first explosion.

5. A control device for an internal combustion engine, the internal combustion engine including a fuel injection valve configured to inject fuel into a cylinder and a variable valve device configured to change an opening timing and a closing timing of at least an intake valve among the intake valve and an exhaust valve, the control device for the internal combustion engine configured to control a fuel injection amount based on an intake air amount of the internal combustion engine and control the opening timing and the closing timing of the intake valve with the variable valve device based on an operating state of the internal combustion engine, the control device for the internal combustion engine comprising:

a determination unit configured to determine whether an inside of a cylinder is in a wet concerned state in which fuel wet is concerned or the inside of the cylinder is in a liquid particle float state in which a large volume of floating liquid particle of fuel arise, when the internal combustion engine is started;

a first control unit configured to perform, as a control of the opening timing and the closing timing with the variable valve device, a first control to reduce the intake air amount when the determination unit determines that the inside of the cylinder is in the wet concerned state; and a second control unit configured to perform, as the control of the opening timing and the closing timing with the variable valve device, a second control to raise an in-cylinder temperature when the determination unit determines that the inside of the cylinder is in the liquid particle float state;

a restart control unit configured to automatically stop the internal combustion engine when a predetermined automatic stop condition is satisfied and subsequently to automatically start the internal combustion engine when a predetermined restart condition is satisfied, wherein on condition that the internal combustion engine is started by the restart control unit, a first period is after the internal combustion engine is initially rotated with the starting device to rotate the output shaft of the internal combustion engine until a rotation speed of the internal combustion engine becomes stable, and a second period is after the rotation speed of the internal combustion engine becomes stable, on condition that the internal combustion engine is not started by the restart control unit, the first period is a period of one combustion cycle after first explosion of the internal combustion engine, and the second period follows the period of the one combustion cycle after the first explosion, and the determination unit is configured to determine that the inside of the cylinder is in the wet concerned state in the first period and determine that the inside of the cylinder is in the liquid particle float state in the second period.

6. The control device for the internal combustion engine according to claim 1, wherein the first control unit is configured to perform, as the first control, an early closing control or a late closing control for separating the closing timing of the intake valve from a bottom dead center, and the second control unit is configured to perform, as the second control, a control to bring the closing timing of the intake valve closer to the bottom dead center or to increase a valve overlap in which both the intake valve and the exhaust valve are opened.

7. The control device for the internal combustion engine according to claim 1, wherein the computation unit is configured to compute the amount of unvaporized fuel generated in the cylinder among fuel, which has been injected into the cylinder, based on at least one of the temperature of the internal combustion engine, the fuel injection amount of the fuel injection valve, and the fuel pressure of fuel supplied to the fuel injection valve.

8. The control device for the internal combustion engine according to claim 1, wherein the computation unit is configured to:

compute the amount of unvaporized fuel to be larger as a cooling water temperature becomes lower, compute the amount of unvaporized fuel to be larger as the fuel injection amount becomes larger, and compute the amount of unvaporized fuel to be larger as the fuel pressure becomes lower.

9. The control device for the internal combustion engine according to claim 1, wherein when the unvaporized fuel amount is larger than a first temperature determination value, the determination is made that the inside of the cylinder is in the wet concerned state;

when the unvaporized fuel amount is equal to or less than the first temperature determination value and is larger than a second temperature determination value, the determination is made that the inside of the cylinder is in the liquid particle float state; and the second temperature determination value is smaller than the first temperature determination value.

10. The control device for the internal combustion engine according to claim 1, wherein when the unvaporized fuel amount is larger than a first injection amount determination value, the determination is made that the inside of the cylinder is in the wet concerned state;

when the unvaporized fuel amount is equal to or less than the first injection amount determination value and is larger than a second injection amount determination value, the determination is made that the inside of the cylinder is in the liquid particle float state;

the second injection amount determination value is a value smaller than the first injection amount determination value.

11. The control device for the internal combustion engine according to claim 1, wherein when the unvaporized fuel amount is larger than a first fuel pressure determination value, the determination is made that the inside of the cylinder is in the wet concerned state;

when the unvaporized fuel amount is equal to or less than the first fuel pressure determination value and is larger than a second fuel pressure determination value, the determination is made that the inside of the cylinder is in the liquid particle float state; and the second fuel pressure determination value is a value smaller than the first fuel pressure determination value.

12. The control device for the internal combustion engine according to claim 1, wherein performing the first control includes reducing the fuel injection amount.

13. The control device for the internal combustion engine according to claim 1, wherein performing the second control includes increasing a compression ratio in a compression stroke of the internal combustion engine.

* * * * *